(12) United States Patent
Yukumoto et al.

(10) Patent No.: US 8,496,731 B2
(45) Date of Patent: Jul. 30, 2013

(54) METHOD FOR TRANSPORTING FLUID

(75) Inventors: Atsuhiro Yukumoto, Hiroshima (JP);
Hiroyuki Osora, Hiroshima (JP);
Yoshio Seiki, Hiroshima (JP); Akira Oguchi, Mihara (JP); Shuichi Kashima, Tokyo (JP); Haruaki Hirayama, Mihara (JP); Hiroko Oguchi, legal representative, Kanagawa (JP); Noboru Oguchi, legal representative, Tokyo (JP); Sachiko Oguchi, legal representative, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 567 days.

(21) Appl. No.: 12/523,620

(22) PCT Filed: Mar. 14, 2008

(86) PCT No.: PCT/JP2008/054791
§ 371 (c)(1),
(2), (4) Date: Apr. 5, 2010

(87) PCT Pub. No.: WO2008/111673
PCT Pub. Date: Sep. 18, 2008

(65) Prior Publication Data
US 2010/0258197 A1 Oct. 14, 2010

(30) Foreign Application Priority Data
Mar. 15, 2007 (JP) .................. 2007-066286

(51) Int. Cl.
*B01D 61/36* (2006.01)
*B01D 53/22* (2006.01)

(52) U.S. Cl.
USPC ............. 95/52; 96/6; 210/180; 210/640

(58) Field of Classification Search
USPC ............. 137/13; 210/180, 638, 640, 641, 210/651; 95/52; 96/6
See application file for complete search history.

(56) References Cited

U.S. PATENT DOCUMENTS

| 3,608,610 A | 9/1971 | Greatorex et al. |
| 4,978,430 A | 12/1990 | Nakagawa et al. |

(Continued)

FOREIGN PATENT DOCUMENTS

| GB | 2170219 A | 7/1986 |
| JP | 44-9443 B | 5/1969 |

(Continued)

OTHER PUBLICATIONS

European Search Report dated Dec. 5, 2011, issued in European Patent Application No. 08722178.4 (corresponding U.S. Appl. No. 12/522,791).

(Continued)

*Primary Examiner* — Jason M Greene
(74) *Attorney, Agent, or Firm* — Westerman, Hattori, Daniels & Adrian, LLP

(57) ABSTRACT

There is provided a method for transporting a fluid, in which even if the fluid is transported for a long period of time, dehydration after transportation is not needed, and the transported fluid can be used immediately after transportation. Specifically, there is provided a method for transporting a fluid, comprising steps of: dehydrating some of the transportation fluid during transportation by using a dehydration system comprising a separation membrane through which water permeates, and returning the dehydrated fluid to the transportation fluid so as to keep water content in the transportation fluid in a fixed range. In one embodiment, the transportation fluid is a liquid, and the dehydration system comprises a heater for heating the liquid to a temperature in a range in which the liquid does not boil, and a membrane separation apparatus for dehydrating the heated liquid, wherein the membrane separation apparatus is a PV method apparatus comprising a primary side chamber extending in an up and down direction to introduce the liquid from a lower portion thereof and discharge it from an upper portion thereof, a separation membrane in contact with the primary side chamber to allow water in the liquid to permeate through as a gas, and a secondary side chamber being located on the opposite side to the primary side chamber with the separation membrane held therebetween and being under a pressure lower than that in the primary side chamber.

6 Claims, 2 Drawing Sheets

U.S. PATENT DOCUMENTS

| | | | |
|---|---|---|---|
| 4,997,462 | A | 3/1991 | Nakatani et al. |
| 5,143,526 | A | 9/1992 | Lee et al. |
| 5,151,190 | A * | 9/1992 | Seiryo .......................... 210/640 |
| 5,294,345 | A | 3/1994 | Kaschemekat |
| 5,494,556 | A | 2/1996 | Mita et al. |
| 5,556,539 | A | 9/1996 | Mita et al. |
| 5,582,721 | A | 12/1996 | Mita et al. |
| 5,616,247 | A * | 4/1997 | Mita et al. .................... 210/640 |
| 5,755,967 | A * | 5/1998 | Meagher et al. .............. 210/640 |
| 5,868,906 | A | 2/1999 | Adams et al. |
| 6,210,464 | B1 | 4/2001 | Nakanishi et al. |
| 6,660,165 | B1 | 12/2003 | Hirabayashi et al. |
| 6,899,741 | B2 | 5/2005 | Nakamura et al. |
| 6,928,750 | B2 | 8/2005 | Kashkoush et al. |
| 7,045,062 | B1 | 5/2006 | Aminabhavi et al. |
| 7,459,084 | B2 | 12/2008 | Baig et al. |
| 7,655,141 | B2 | 2/2010 | Bruschke et al. |
| 7,699,961 | B2 | 4/2010 | Ikeda et al. |
| 7,732,173 | B2 * | 6/2010 | Mairal et al. .................. 435/161 |
| 7,871,520 | B2 | 1/2011 | Ma et al. |
| 7,892,321 | B2 | 2/2011 | Aagesen et al. |
| 8,002,874 | B2 | 8/2011 | Huang et al. |
| 8,128,787 | B2 | 3/2012 | Wynn et al. |
| 2003/0101866 | A1 * | 6/2003 | Noack .............................. 95/45 |
| 2004/0211726 | A1 | 10/2004 | Baig et al. |
| 2004/0256212 | A1 | 12/2004 | Ikeda et al. |
| 2007/0112189 | A1 | 5/2007 | Ikeda et al. |
| 2008/0099400 | A1 * | 5/2008 | Nemser et al. ................ 210/638 |

FOREIGN PATENT DOCUMENTS

| | | | |
|---|---|---|---|
| JP | 50-132896 | U | 10/1975 |
| JP | 54-033279 | | 3/1979 |
| JP | 58-11083 | A | 1/1983 |
| JP | 58-021629 | A | 2/1983 |
| JP | 60-202705 | A | 10/1985 |
| JP | 62-011088 | A | 1/1987 |
| JP | 62-237906 | A | 10/1987 |
| JP | 63-278522 | A | 11/1988 |
| JP | 01-236905 | A | 9/1989 |
| JP | 02-071829 | A | 3/1990 |
| JP | 02-229529 | A | 9/1990 |
| JP | 2-273519 | A | 11/1990 |
| JP | 2-059394 | B2 | 12/1990 |
| JP | 04-281827 | A | 10/1992 |
| JP | 4-313333 | A | 11/1992 |
| JP | 05-103956 | A | 4/1993 |
| JP | 06-254354 | A | 9/1994 |
| JP | 06-277402 | A | 10/1994 |
| JP | 06-287153 | A | 10/1994 |
| JP | 06-304453 | A | 11/1994 |
| JP | 07-124444 | A | 5/1995 |
| JP | 9-220563 | A | 8/1997 |
| JP | 10-180046 | A | 7/1998 |
| JP | 11-156167 | A | 6/1999 |
| JP | 2003-093828 | A | 4/2003 |
| JP | 2003-530999 | A | 10/2003 |
| JP | 2004-131024 | A | 4/2004 |
| JP | 2004-255283 | A | 9/2004 |
| JP | 2005-145773 | A | 6/2005 |
| JP | 2007-045482 | A | 2/2007 |
| JP | 2007-275690 | A | 10/2007 |
| WO | 86/01425 | A1 | 3/1986 |

OTHER PUBLICATIONS

European Search Report dated Dec. 5, 2011, issued in European Patent Application No. 08722186.7 (corresponding U.S. Appl. No. 12/522,831).
European Search Report dated Dec. 5, 2011, issued in European Patent Application No. 08722187.5 (corresponding U.S. Appl. No. 12/523,620).
International Search Report of PCT/JP2008/054791, Mailing Date of Apr. 8, 2008.
Japanese Office Action dated Jun. 24, 2011, issued in corresponding Japanese Patent Application No. 2007-066286.
Office Action dated Jul. 28, 2011 of U.S. Appl. No. 12/522,791.
International Search Report of PCT/JP2008/054782, mailing Date of Apr. 22, 2008.
Japanese Office Action dated Jul. 28, 2009, issued in corresponding Japanese Patent Application No. 2007-305646.
International Search Report of PCT/JP2008/054790, mailing date of Apr. 22, 2008.
Japanese Office Action Dated Jul. 28, 2009, issued in corresponding Japanese Patent Application No. 2007-066287.
Decision of Rejection, mailing date of Nov. 17, 2009, issued in corresponding Japanese Patent Application No. 2007-066287.
Japanese Office Action, mailing date of Oct. 16, 2009, issued in corresponding Japanese Patent Application 2006-273918.
International Search Report of PCT/JP2008/054777, mailing date of Apr. 15, 2008.
Technically related U.S. Appl. No. 12/743,997, filed May 20, 2010.
Technically related U.S. Appl. No. 12/522,791, filed Jul. 10, 2009.
Technically related U.S. Appl. No. 12/522,831, filed Jul. 10, 2009.
Extended European Search Report dated Aug. 14, 2012, issued in technically related, European Patent Application No. 08722173.5 (6 pages), corresponding to U. S. Appl. No. 12/743,997.
U.S. Office Action dated Dec. 24, 2012, issued in U.S. Appl. No. 12/743,997.
Extended European Search Report dated Feb. 11, 2013, issued in European Patent Application No. 12175826.2 (corresponding to U.S. Appl. No. 12/522,791).
European Search Report dated Sep. 28, 2012, issued in corresponding European Patent Application No. 12175826.2 (corresponding to U.S. Appl. No. 12/522,791).
Canadian Office Action dated Jan. 4, 2013, issued in Canadian Patent Application No. 2,706,047 (corresponding U.S. Appl. No. 12/743,997).
Canadian Notice of Allowance dated Jan. 23, 2013, issued in Canadian Patent Application No. 2,675,399 (corresponding U. S. Appl. No. 12/522,831).
Canadian Notice of Allowance dated Mar. 8, 2013, issued in corresponding Canadian Patent Application No. 2,676,899 (1 page).
Examiner's Answer dated Feb. 25, 2013, issued in U.S. Appl. No. 12/522,831.
US Office Action dated Apr. 2, 2013, issued in U.S. Appl No. 12/743,997.

* cited by examiner

METHOD FOR TRANSPORTING FLUID

TECHNICAL FIELD

The present invention relates to a method for transporting a fluid, in which the water content of the fluid is not changed substantially before and after transportation, and the fluid having been transported can be used immediately. More specifically, it relates to a method for transporting a fluid, the method being more effective when a liquid having an azeotropic composition with water, which is difficult to be dehydrated once it contains a certain amount or more of water, is transported for a long period of time by using a ship or the like.

BACKGROUND ART

As a fuel source substituting for fossil fuel, ethanol attracts attention, and the market size thereof is predicted to become 55 million kiloliters in the year of 2010. Ethanol used as a fuel is produced by distilling and refining a crude product obtained from a biological raw material such as corn, and dehydrating the refined product to at least 99.7% by weight.

A mixture of ethanol and water has an azeotropic point so that it cannot be concentrated exceeding 95% by weight of concentration of ethanol, which is an azeotropic composition, by the ordinary distillation method.

As a method for dehydration of ethanol, a method has been known in which a dilute ethanol aqueous solution is distilled in a distilling column so as to be concentrated to a point close to the azeotropic point of an ethanol-water system, and then an entrainer is added, and dehydration is accomplished by azeotropic distillation. However, this method has drawbacks such that it is required to have a process in which a three-component system is azeotropically distilled, and further the entrainer is recovered, so that much heat energy is required.

Another method is also available in which a plurality of molecular sieve tanks are arranged in parallel, and dehydration is accomplished while these tanks are switched over in batch mode. However, this method also has a drawback in that the regeneration of the molecular sieve tank consumes much energy.

Furthermore, use of a separation membrane that does not involve the above-described drawbacks has been proposed (Patent Document 1: JP 7-124444A).

DISCLOSURE OF THE INVENTION

Problems to be Solved by the Invention

The present inventors have found that even if ethanol dehydrated to, for example, 99.7% by weight is produced, the increase in water content caused by moisture absorption during transportation cannot be neglected. The ethanol may be used by being dehydrated after transportation. However, the installation of a dehydration facility at the destination of transportation leads to a high cost, and also the installation itself may not be allowed for the reason of environment or national policy.

An object of the present invention is to provide a method for transporting a fluid, in which even if the fluid is transported for a long period of time, dehydration after transportation is not needed, and the transported fluid can be used immediately after transportation.

Means for Solving the Problems

The present invention can provide a method for transporting a fluid, comprising steps of dehydrating some of the transportation fluid during transportation by using a dehydration system comprising a separation membrane through which water permeates, and returning the dehydrated fluid to the transportation fluid so as to keep the water content of the transportation fluid in a fixed range.

In one preferred embodiment of the present invention, the transportation fluid is a liquid and the dehydration system comprises a heater for heating the liquid to a temperature in the range in which the liquid does not boil, and a membrane separation apparatus for dehydrating the heated liquid, wherein the membrane separation apparatus is a pervaporation method apparatus comprising a primary side chamber extending in an up and down direction to introduce the liquid from a lower portion thereof and discharge it from an upper portion thereof, a separation membrane in contact with the primary side chamber to allow water in the liquid to permeate through as a gas, and a secondary side chamber being located on an opposite side to the primary side chamber with the separation membrane being held therebetween and being under a pressure lower than that in the primary side chamber.

In another preferred embodiment of the present invention, a heater for heating the liquid to a temperature in the range in which the liquid does not boil is arranged in an upper portion of the secondary side chamber, and a suction port of a vacuum producer for reducing a pressure is connected to a lower portion of the secondary side chamber, whereby heat convection from the upper portion to the lower portion is formed in the secondary side chamber to heat the separation membrane.

In still another preferred embodiment of the present invention, by pressurizing the liquid before being introduced into the dehydration system so as to increase the temperature at which the liquid boils as compared with the temperature without pressurizing the liquid, and the temperature of heating of the liquid before being introduced into the membrane separation apparatus is increased and/or, if applicable, the temperature of heating of the upper portion of the secondary side chamber is increased.

In yet another preferred embodiment of the present invention, an exhaust heat of the transportation is utilized for the heating of the liquid before being introduced into the membrane separation apparatus and/or the heating of the secondary side chamber.

Advantages of the Invention

According to the method for transporting a fluid in the present invention, the water content of the transportation fluid is not changed substantially before and after transportation owing to the dehydration during transportation, and the fluid having been transported can be used immediately. In particular, even when a liquid having an azeotropic composition with water, which is difficult to be dehydrated in the present of an certain amount or more of water, is transported for a long period of time by using a ship or the like, the transported liquid can be used immediately. Also, utilization of exhaust heat of the ship or the like can reduce the dehydration cost.

DESCRIPTION OF SYMBOLS

Figure 1:
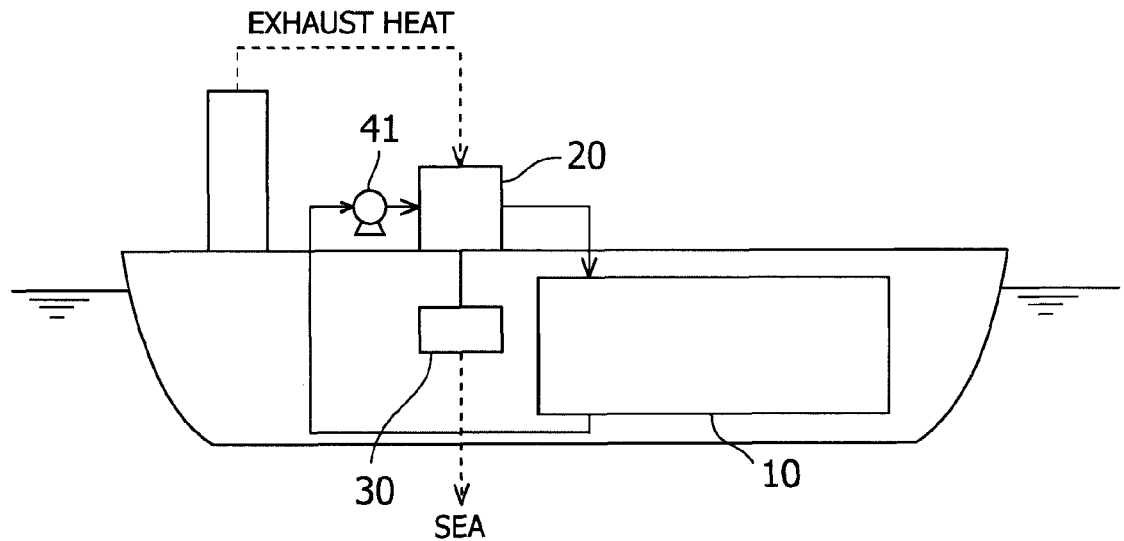
FIG. 1 is a schematic view showing an example of transportation using a ship.

10: tank
20: dehydration system
21: heat exchanger
22: membrane separation apparatus
23: primary side chamber
24: separation membrane
25: secondary side chamber
27: heat exchanger
28: gas-liquid separation apparatus
29: vacuum pump
30: water storage tank
41: pump

BEST MODE FOR CARRYING OUT THE INVENTION

According to the present invention, the transportation for a fluid is not subject to any special restriction and may include a vehicle such as a freight car and a truck and a ship. The present invention may be especially effective in use of a ship navigating on the humid sea generally for a long period of time. The reason for this is that it is difficult to accomplish dehydration during transportation by using the distillation method such as azeotropic distillation because of jolting, vibrations and the like of the transportation itself.

According to the present invention, the fluid to be transported is not be particularly limited and may be suitable for a liquid or a gas in which a change in water content caused by moisture absorption during transportation is to be avoided. It may preferably include ethanol, propanol and acetic acid. It may be more preferably a fluid whose mixture with water has an azeotropic point, such as ethanol and propanol.

The water content of the fluid in which a change in water content before and after transportation is to be avoided or in which water content is to be lowered than that before transportation, may differ depending on application purposes after transportation.

When ethanol is used as a fuel after transportation, ethanol having preferably 99.7% by weight or higher purity may be transported. According to the present invention, it may be also effective in transportation of absolute ethanol having purity exceeding 95% by weight which is an azeotropic composition because it is difficult to be dehydrated once moisture is absorbed.

When transported propanol is used for cleaning semiconductors, almost water-free propanol has to be transported because a high purity is required.

FIG. 1 shows an example of transportation using a ship.

A fluid to be transported is stored in a tank 10. Some of the fluid is supplied to a dehydration system 20 comprising a separation membrane through which water permeates, by using a pump 41. The fluid having been dehydrated is returned to the fluid tank 10, and water produced by dehydration is collected in a water storage tank 30. The water in the water storage tank 30 can be discarded to the sea if allowable. When the water in the water storage tank 30 contains a very small amount of fluid to be transported, it can be returned to a fluid refining process after transportation so as to obtain the fluid out of the water. When the dehydration system 20 requires heating, the exhaust heat of the ship can be utilized. When the dehydration system 20 requires cooling, sea water can be utilized.

When the fluid is a liquid, the dehydration system may preferably comprise a membrane separation apparatus for using the pervaporation (PV) method. This membrane separation apparatus preferably comprises a primary side chamber extending in an up and down direction to introduce the liquid from a lower portion thereof and discharge it from an upper portion thereof, a separation membrane in contact with the primary side chamber to allow water in the liquid to permeate through as a gas, and a secondary side chamber being located on the opposite side to the primary side chamber with the separation membrane held therebetween and being under a pressure lower than that in the primary side chamber.

When the fluid is a gas, the dehydration system may preferably comprise a membrane separation apparatus for using the vaporpermeation (VP) method.

The separation membrane used for the PV method achieves a molecule sieving effect, allowing water vapor, which is a small molecule gas, to permeate through, while preventing vaporization gas of transportation liquid, which is a large molecule gas, from permeating through. The separation membrane is not particularly limited as long as it does not react with the transportation liquid and has resistance to heating and depressurization. The separation membrane used for the PV method may be preferably made of inorganic material and may be preferably a porous membrane having fine pores having preferably 10 angstrom or smaller pore diameter which is controlled precisely. A preferred example may include a carbon membrane, a silica membrane and a zeolite membrane each having 10 angstrom or smaller pore diameter.

The separation membrane used for the VP method achieves a molecule sieving effect, allowing water vapor, which is a small molecule gas, to permeate through, while preventing the transportation gas, which is a large-molecule gas, from permeating through. This separation membrane is not particularly limited as long as it does not react with the transportation gas and has resistance to heating and depressurization.

A permeation flux is a rate at which water permeates the separation membrane as a gas, and provides an index of the membrane performance of the separation membrane. In the PV method, the permeation flux increases as the temperature of the water-containing liquid to be treated increases. Accordingly, the liquid is preferably heated by using a heater before passing through the separation membrane. However, if the liquid is heated to a gasification level, a phenomenon called cavitation in which a mixture of gas and liquid exists occurs. The cavitation causes erosion of the membrane so that the liquid has to be kept at a temperature at which the liquid is not gasified.

For example, when 95% by weight ethanol is heated to the range of from 70° C. to a temperature just before boiling (about 80° C.) and dehydrated through the separation membrane to obtain 99.7% by weight ethanol in accordance to the PV method, a permeation flux of 1 to 3 $kg/m^2h$ can be obtained. The flow velocity of 95% by weight ethanol to be permeated is adjusted according to the permeation flux and is typically 0.5 to 1 m/sec. The degree of depressurization of the secondary side chamber is also adjusted according to the permeation flux and is typically 10 to 100 Torr.

If the permeation flux can be increased, in other words, if the permeation rate of water can be increased, efficient dehydration can be accomplished. The present inventors have found that when water is removed from the liquid by using the PV method, since the temperatures of the liquid and the separation membrane decrease from a liquid inlet to a liquid outlet, the highest permeation flux can be obtained in the vicinity of the liquid inlet that is in contact with the heated liquid, but the permeation flux decreases subsequently and only a low permeation flux can be obtained in the vicinity of the liquid outlet, resulting in a low permeation flux as a whole.

It is believed that although gaseous water permeates the separation membrane, the temperature of the separation membrane is decreased by the heat of vaporization absorbed by the gasification of water. This phenomenon occurs in the PV method for treating liquid, but does not occur in the VP method for treating gas. To apply the VP method to liquid, the liquid has to be gasified, and the exhaust heat of transportation can also be utilized for gasification.

The present inventors has found that when water is removed from the liquid by using the PV method, a heater is arranged at an upper portion of the secondary side chamber near the liquid outlet, and the suction port of a pressure reducer such as a vacuum pump is connected to a lower portion of the secondary side chamber near the liquid inlet so that heat convection directed from the upper portion to the lower portion is formed in the secondary side chamber, thereby the temperature distribution of the separation membrane can be uniformized. The heater may include an electric heater and a steam heater. An exhaust heat of transportation may be utilized. When the heat convection is utilized, although depending on the operating conditions, the permeation flux can be improved, for example, by a factor of 1.5 to 3 as compared with that of when the liquid is not heated.

To further uniformize the temperature distribution of the separation membrane by means of heat convection, in addition to the arrangement of the heater, an inert dry gas such as nitrogen or argon may be introduced from a part around the upper portion of the secondary side chamber. For example, when the secondary side chamber is kept at a pressure of 10 to 100 Torr, a dry gas can be introduced at a flow rate of 0.1 to 5 m/sec, preferably 0.1 to 2 m/sec. The dry gas may be heated before being introduced.

As described above, in the PV method, the permeation flux increases as a temperature of the water-containing liquid to be treated increases. However, if the liquid is heated to a gasification level, cavitation in which a mixture of gas and the liquid exists occurs so that the liquid has to be kept at a temperature at which the liquid is not gasified. The liquid may be preferably heated to a temperature in such a range that the liquid does not boil, preferably to a temperature in the range of from the temperature of 10 to 30° C. lower than the boiling temperature of the liquid to the temperature just before the liquid boils. The specific temperature range may differ depending on the kind of liquid to be dehydrated. For example, when 99.7% by weight ethanol is obtained from 95% by weight ethanol, the 95% by weight ethanol may be heated to a temperature in the range of from 70° C. to the temperature just before it boils (lower than 80° C.).

The present inventors have found that the liquid boiling temperature is raised by pressurizing the primary side chamber, thereby the liquid can be treated at a higher temperature by the separation membrane without gasification of the liquid so that the permeation flux can be improved. For example, although the boiling point of 95% by weight ethanol is 80° C. at atmospheric pressure (1 atm.), the boiling point thereof is 90° C. at 1.5 atm. and 100° C. at 2 atm, 110° C. at 3 atm., 120° C. at 4 atm. and 150° C. at 10 atm. The liquid may be pressurized in the range in which the liquid is not thermally decomposed and to a pressure which the separation membrane can withstand. Specifically, the liquid may be pressurized to preferably more than 1 atm. and not greater than 10 atm., more preferably 1.5 to 3 atm., and further preferably 2 to 3 atm. The thermal decomposition temperature of ethanol is about 200° C.

When 95% by weight ethanol was pressurized and heated to 2 atm. and from 90° C. to less than 100° C. for dehydration to yield 99.7% by weight ethanol, the permeation flux was improved by 20% as compared with that of when the 95% by weight ethanol was heated to from 70° C. to less than 80° C. at atmospheric pressure. It is believed in this case that not only the influence of temperature but also the differential pressure between the primary and secondary side chambers contributes to the improvement in permeation flux because the pressure in the primary side chamber is higher than that in the secondary side chamber.

The pressurization of the liquid before being introduced into the membrane separation apparatus and of the liquid in the primary side chamber can be performed, for example, by using a booster pump before the liquid to be introduced into the membrane separation apparatus is heated.

Figure 2:
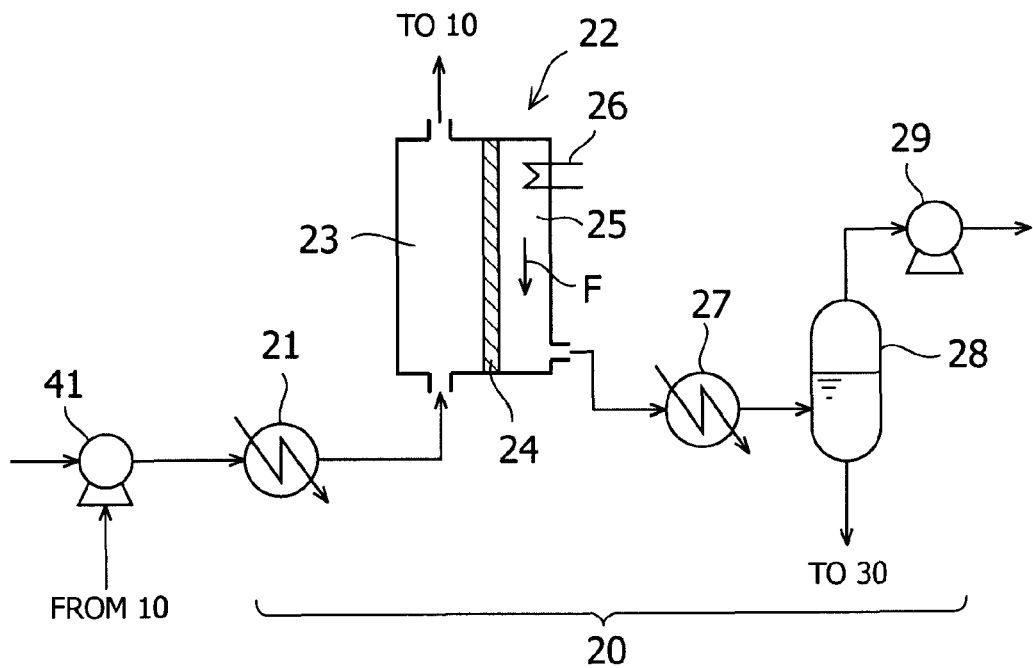
FIG. 2 is a flow diagram showing one example of a dehydration system 20 when the transportation fluid is a liquid.

FIG. 2 shows one example of the dehydration system 20 in which the transportation fluid is a liquid. To increase the permeation flux, a heat exchanger 21 as a heater is provided upstream of a membrane separation apparatus 22. The membrane separation apparatus 22 comprises a primary side chamber 23 extending in an up and down direction to introduce the liquid from a lower portion thereof and discharge it from an upper portion thereof, a separation membrane 24 in contact with the primary side chamber to allow water in the liquid to permeate through as a gas, and a secondary side chamber 25 being located on the opposite side to the primary side chamber with the separation membrane held therebetween and being under a pressure lower than that in the primary side chamber. The pressure of the secondary side chamber 25 is reduced by a vacuum pump 29.

The liquid supplied from the tank 10 may be heated by the heat exchanger 21 to a temperature as high as possible in the range in which the liquid does not boil, and is introduced into the primary side chamber 23 of the membrane separation apparatus 22. Water contained by the liquid in the primary side chamber 23 permeates the separation membrane 24, moves into the secondary side chamber 25, is cooled and condensed by a cooler (for example, a heat exchanger 27), and is recovered by a gas-liquid separation apparatus 28. The dehydrated liquid in the primary side chamber 23 is discharged out of the primary side chamber 23 and is returned to the fluid storage tank 10.

In FIG. 2, a suction port of the vacuum pump 29 is connected to a part around the liquid inlet of the secondary side chamber 25, and a heater 26 is provided at a part around the liquid outlet of the secondary side chamber 25. Thereby, heat convection directed from the liquid outlet to the liquid inlet is formed in the secondary side chamber to heat the separation membrane so that the temperature distribution of the separation membrane is uniformized. Although the heater is provided in the secondary side chamber in FIG. 2, the heater may be provided on the outside of the secondary side chamber to heat the secondary side chamber.

FIG. 2 exhibits the membrane separation apparatus in which the separation membrane is arranged between the primary side chamber and the secondary side chamber. However, the configuration of the membrane separation apparatus is not limited to this.

A cylindrical separation membrane that surrounds the primary side chamber to have one primary side chamber therein is called a tubular type separation membrane. A cylindrical separation membrane in which a plurality of tubular primary side chambers are placed parallel in the height direction is called a monolith type separation membrane, wherein the fluid passes through the plurality of primary side chambers and the cross section of the primary side chambers is similar to that of a lotus root.

According to the present invention, the tubular type separation membrane or the monolith type separation membrane can be used. When the tubular type separation membrane is used, the primary side chamber, the separation membrane and the secondary side chamber are arranged from the inside to the outside in a concentric circle form. When the monolith type separation membrane is used, although depending on the number of primary side chambers, the primary side chambers (or the separation membranes) and the separation membranes (or the primary side chambers), which are arranged alternately, and the secondary side chamber are arranged from the inside to the outside in a concentric circle form.

The size of the separation membrane can be selected according to the amount of liquid to be dehydrated, the water content, the desired dehydration rate and the like. In one embodiment of the monolith type separation membrane, thirty hollow tubes as the primary side chambers each having a diameter of 3 mm and a length of 150 mm are provided in parallel in the lengthwise direction in a columnar separation membrane having a diameter of 30 mm and a length of 150 mm. In another embodiment of the monolith type separation membrane, two thousand hollow tubes as the primary side chambers each having a diameter of 2 mm and a length of 1 m are provided in parallel in the lengthwise direction in a columnar separation membrane having a diameter of 150 to 200 mm and a length of 1 m.

Figure 3:
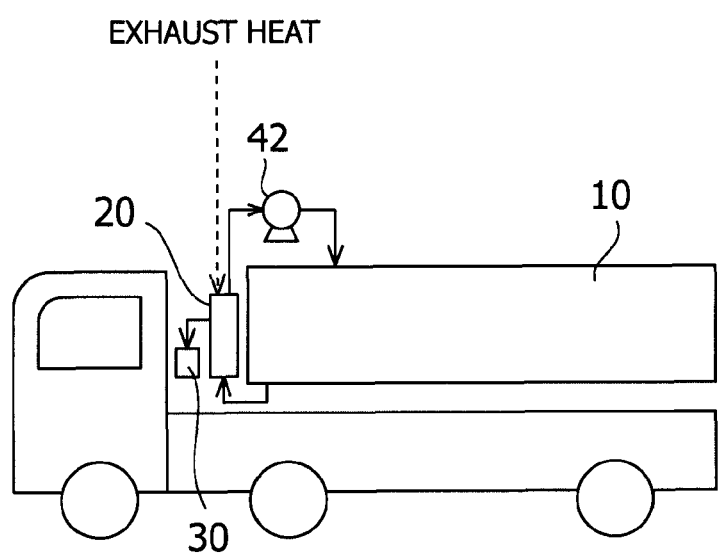
FIG. 3 is a schematic view showing an example of transportation using a truck.

The present invention is not limited to a ship, but is applicable to a vehicle such as an electric train or a motor vehicle, an airplane, and the like. FIG. 3 shows an example of transportation using a truck.

A fluid to be transported is stored in a tank 10. Some of the fluid is supplied to a dehydration system 20, comprising a separation membrane through which water permeates. The fluid having been dehydrated is returned, as necessary, to the fluid tank 10 by using a pump 42, while water produced by dehydration is collected in a water storage tank 30. When the water in the water storage tank 30 contains a very small amount of the fluid to be transported, the fluid-containing water can be reused in a fluid refining process after transportation to obtain fluid out of the water. When the dehydration system 20 has to be heated, an exhaust heat of the truck can be utilized. To supply some of the fluid to the dehydration system 20, a pump may be used. However, the pump can be omitted by utilizing the principle of siphon.

According to the present invention, the frequency of dehydration treatment of fluid during transportation may be periodical or continuous depending on the amount of transportation fluid and ease of moisture absorption. A device for measuring the water content may be connected to the tank 10 so that the fluid can be introduced into the dehydration system when the concentration of fluid reaches a certain value or smaller. The device for measuring the water content may include a gas chromatograph and a density meter. The transportation fluid in the tank 10 can be agitated by jolting, vibrations or the like of the transportation itself so that installation of an agitator is optional.

The invention claimed is:

1. A method for transporting a fluid, comprising steps of:
   dehydrating some of the transportation fluid during transportation by using a dehydration system comprising a separation membrane through which water permeates, and
   returning the dehydrated fluid to the transportation fluid so as to keep water content in the transportation fluid in a fixed range,
   wherein
   said transportation fluid is a liquid, and
   said dehydration system comprises
      a heater for heating the liquid to a temperature in a range in which the liquid does not boil, and
      a membrane separation apparatus for dehydrating the heated liquid, wherein the membrane separation apparatus is a pervaporation method apparatus comprising a primary side chamber extending in an up and down direction to introduce the liquid from a lower portion thereof and discharge the liquid from an upper portion thereof, a separation membrane in contact with the primary side chamber to allow water in the liquid to permeate through as a gas, and a secondary side chamber being located on the opposite side to the primary side chamber with the separation membrane held therebetween and being under a pressure lower than that in the primary side chamber, and
   a heater for heating the liquid to a temperature in a range in which the liquid does not boil is arranged in an upper portion of said secondary side chamber, and a suction port of a vacuum producer for reducing a pressure is connected to a lower portion of said secondary side chamber, whereby heat convection from the upper portion to the lower portion is formed in said secondary side chamber to heat said separation membrane.

2. The method for transporting a fluid according to claim 1, further comprising steps of
   pressurizing the liquid before being introduced into the dehydration system so as to increase the temperature at which the liquid boils as compared with the temperature without pressuring the liquid, and
   increasing the temperature of heating of the liquid before being introduced into the membrane separation apparatus and/or the temperature of heating of the upper portion of the secondary side chamber.

3. The method for transporting a fluid according to claim 1, wherein said heating of the liquid before being introduced into the membrane separation apparatus and/or said heating of the secondary side chamber utilizes an exhaust heat of transportation.

4. The method for transporting a fluid according claim 1, wherein said separation membrane is a carbon membrane, a silica membrane or a zeolite membrane, each having 10 angstrom or smaller pore diameter.

5. The method for transporting a fluid according to claim 1, wherein said transportation fluid is a mixture of ethanol and water, or a mixture of propanol and water.

6. The method for transporting a fluid according to claim 1, wherein an inert dry gas is introduced from the upper portion of the secondary side chamber into the secondary side chamber to further uniformize a temperature distribution of the separation membrane by means of the heat convection.

* * * * *